Nov. 26, 1968  J. H. UPHOFF  3,413,598
LOW TIRE PRESSURE WARNING SYSTEM
Filed March 21, 1966
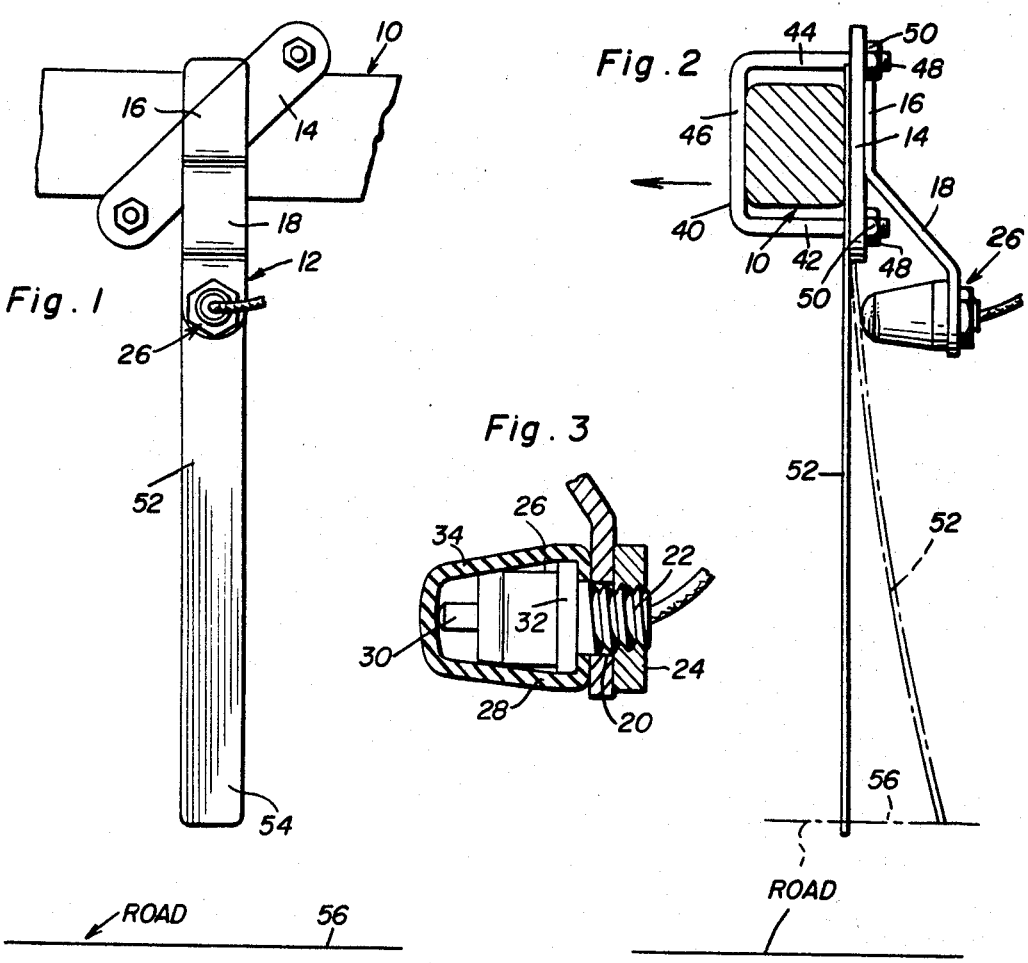
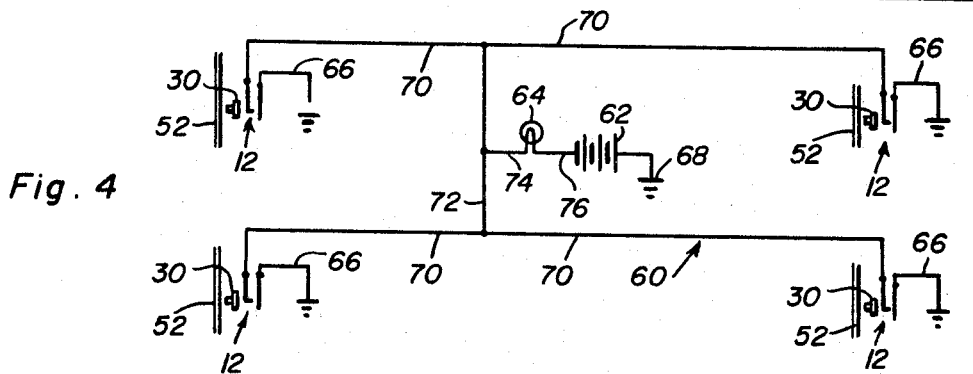
Joseph H. Uphoff
INVENTOR.

United States Patent Office 3,413,598
Patented Nov. 26, 1968

3,413,598
LOW TIRE PRESSURE WARNING SYSTEM
Joseph H. Uphoff, 1288 E. Lincoln,
Woodburn, Oreg. 97071
Filed Mar. 21, 1966, Ser. No. 535,968
5 Claims. (Cl. 340—58)

ABSTRACT OF THE DISCLOSURE

A stationarily supported strap-type spring metal feeler arm fixedly mounted at its upper end to and dependingly supported from an unsprung portion of a pneumatic tired vehicle and having a portion of its upper end below its point of fixed mounting operatively associated with a horizontally shiftable switch actuator for engagement therewith and horizontal shifting of the actuator in response to rearward deflection of the lower end of the feeler arm during forward movement of the associated vehicle brought about by the unsprung portion of the vehicle being lowered relative to the ground as one of the pneumatic tires of the vehicle deflates to thus lower the lower end of the feeler arm into contact with the ground.

---

This invention relates to a novel and useful low tire pressure warning system and more specifically to an assemblage adapted to be supported from the running gear of a vehicle adjacent one wheel thereof and against vertical movement relative to the one wheel. The assemblage includes a depending resilient feeler whose lower end portion is adapted for contact with the ground as the wheel rim of the one wheel is lowered relative to the ground due to the tire casing of the one wheel becoming partially deflated.

The upper end of the feeler is rigidly supported from the assemblage and the latter includes an alarm signal actuating switch provided with a reciprocal actuator and the switch is supported from the assemblage adjacent the upper end of the feeler with the latter disposed for engagement with the switch actuator to operate the same upon slight flexing of the feeler due to its contact with the ground during movement of the vehicle.

The alarm signal actuating switch includes a flexible waterproof enclosure in which the switch actuator is fully encased and accordingly any areas of sliding contact between the switch actuator and the body of the switch are fully enclosed and protected from dirt, water, snow and ice and the feeler is caused to operate the actuator through the flexible cover.

The main object of this invention is to provide a low tire pressure warning device for vehicles equipped with pneumatic tires and which includes only one moving part other than a rigidly supported and resilient feeler and switch actuator and which moving part is completely enclosed within a water dustproof cover.

Another object of this invention is to provide a low tire pressure warning device in accordance with the immediately preceding object including mounting means therefor adapting the warning device for ready securement to unsprung portions of substantially all types of running gear.

A final object of this invention to be specifically enumerated herein is to provide a low tire pressure warning device which will conform to conventional forms of manufacture, be of simple construction and easy to install so as to provide a device that will be economically feasible, long lasting and relatively troublefree in installation.

These together with other objects and advantages which will become subsequently apparent reside in the detatils of construction and operation as more fully hereinafter described and claimed, reference being had to the accompanying drawings forming a part hereof, wherein like numerals refer to like parts throughout, and in which:

FIGURE 1 is a fragmentary elevational view of the low tire pressure warning device of the instant invention as seen from the rear thereof and illustrated supported from an axle beam;

FIGURE 2 is a side elevational view of the assemblage illustrated in FIGURE 1 as seen from the left side thereof;

FIGURE 3 is an enlarged fragmentary vertical sectional view taken substantially upon a plane passing through the center of the actuating switch portion of the device; and FIGURE 4 is a diagrammatical view illustrating the manner in which a plurality of the low tire pressure warning devices of the instant invention may be operatively connected to a sigle electrically actuatable warning device of the associated vehicle.

Referring now more specifically to the drawings the numeral 10 generally designates an unsprung portion of vehicle running gear from which it is to be understood pneumatic grund engaging support wheels (not shown) are rotatably journaled. The unsprung portion 10 could be a solid transverse axle member or any other unsprung portion of vehicle running gear which is mounted for vertical movement with the associated ground engaging support wheels.

The low tire pressure warning device of the instant invention is generally referred to by the reference numeral 12 and includes a base plate 14 to which one end portion 16 of an elongated rigid support arm 18 is secured. The other end of the support arm 18 is suitably apertured as at 20 and a tubular threaded mounting shank portion 22 is secured through the aperture 20 in any convenient manner such as by a threaded nut 24. This shank portion 22 comprises the mounting base of an actuating switch assembly generally referred to by the reference numeral 26 and the assembly 26 includes a main body portion 28 which is generally cylindrical in configuration and from which a switch actuator 30 is supported for reciprocation between an off position and an on position. The actuator 30 is illustrated in its outermost off position in FIGURE 3 of the drawings and must be displaced inwardly of the body 28 in order to actuate the switch assembly 26.

The body portion 28 includes a diametrically enlarged and radially outwardly projecting circumferential flange or shoulder 32 which opposes the portions of the arm 18 disposed about the aperture 20 formed therethrough and a resilient and flexible waterproof cover 34 which is cup-shaped in configuration and includes an annular partial end wall 36 on its open end is telescoped over the body portion 28 with the partial end wall 36 disposed between the flange or shoulder 32 and the opposing portions of the support arm 18. Accordingly, the cover 34 completely encloses the body portion 28 of the switch assembly 26 from which the switch actuator 30 is supported and thereby protects the single moving portion of the switch assembly 26, the actuator 30, from dust, water, snow and ice.

The base plate 14 includes a generally U-shaped mounting bolt 40 including a pair of leg portions 42 and 44 interconnected by means of a bight portion 46. The free ends of the leg portions 42 and 44 are externally threaded as at 48 and are passed through suitable apertures (not shown) provided therefor in opposite ends of the base plate 14 with the running gear portion or axle member 10 disposed between the bight portion 46 and the base plate 14. Suitable fasteners 50 are utilized to clampingly secure the bolt 40 and the base plate 14 about the axle member 10 and the upper end portion of a stiff but resilient strap-like feeler arm 52 is disposed between the axle member 10 and the base plate 14. The clamping action of the U-bolt 40 and the base plate 14 on the axle 10 secures the upper end portion of the feeler 52 in position and the feeler 52 may be vertically adjusted relative to the axle beam merely by loosening the fasteners 50 and then shifting the feeler 52 to the desired position before retightening the nuts 50. As an alternative, the upper end portion of the feeler 52 could be secured directly to the base plate 14.

The lower end portion 54 of the feeler 52 is disposed for engagement with the road surface 56 in the event the air pressure within a pneumatic tire rotatably journaled from the axle 10 is sufficiently reduced to cause the associated wheel to drop slightly toward the road surface 56. In FIGURE 2 of the drawings the phantom line positions of the road surface 56 and the feeler 52 illustrate the manner in which the feeler 52 may be deflected upon contact with the road surface 56 so as to cause the upper end of the feeler 52 to engage the cover 34 and shift the switch actuator 30 inwardly to operate the switch assembly 26.

With attention now directed more specifically to FIGURE 4 of the drawings there may be seen a wiring diagram generally designated by the reference numeral 60 which electrically connects the battery 62 of an associated vehicle and four of the low tire warning devices 12 of the instant invention with a single electrically actuatable warning signal 64.

The electrical circuit represented by the diagram 60 includes grounding portions 66 which ground the actuating switch assemblies, the battery 62 also being grounded at 68. Each of the switch actuators 30, when displaced inwardly, is operative to electrically connect the branch conductors 70 of the circuit 60 with the corresponding grounding portion 66 and the branch conductors 70 are electrically connected by means of a conductor 72 with which the electrically actuatable signal or alarm 64 is electrically connected by means of a conductor 74. Further, the alarm or signal 64 is also electrically connected to the battery 62 by means of a conductor 76. Accordingly, upon deflection of either of the feelers 52 in the manner illustrated by the phantom line showing in FIGURE 2 of the drawings, the corresponding actuating switch assembly 26 will be actuated to electrically connect the alarm or signal 64 with the corresponding grounding portion 66 and thus cause the alarm or signal 64 to be electrically actuated. Finally, inasmuch as the feeler 52 is constructed of spring metal or the like, should the associated vehicle tire go flat while the vehicle is not in motion, the feeler will become bowed upon engagement with the ground and therefore prevent damage from being inflicted upon the switch assembly which might be the case if the feeler were connected directly to the switch actuator. Further, since the feeler is clampingly supported, if the clamping action thereon is not too great, the feeler may shift longitudinally relative to the base plate 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A low tire pressure warning assembly comprising a base adapted to be supported in fixed position from an unsprung portion of a wheeled vehicle, an elongated spring feeler arm fixedly secured to and dependingly supported from said base and adapted to have its lower end biased rearwardly relative to the direction of travel of the associated vehicle upon contact of the lower end of said feeler arm with the supporting surface on which said vehicle is disposed, electrical signal means actuating switch means supported in fixed position relative to said base including a portion disposed for engagement by an upper deflectable portion of said feeler arm spaced below said base and above the lower end of said feeler arm in response to said feeler arm having its lower end and said portion biased rearwardly by contact with said supporting surface during forward movement of said vehicle, said switch means being adapted to be electrically connected to a suitable source of electrical potential and to said electrical signal means for actuation of the latter upon actuation of said switch means, said feeler arm being strap-like in configuration and constructed of stiff but resilient spring metal, whereby should an associated tire go flat while the vehicle is not in motion the feeler arm will become bowed upon engagement of its lower end with the ground and therefore prevent damage from being inflicted on the switch assembly or feeler arm.

2. The combination of claim 1 wherein said switch means includes a body portion having an actuator movably supported therefrom for horizontal shifting movement, said body portion being stationarily positioned relative to said base, and a flexible waterproof cover secured over said actuator and the adjacent portions of said body portion and secured to the latter in fluid-tight sealed engagement therewith, said portion of said feeler arm, upon rearward biasing of the lower end of said arm, being operable to inwardly deflect said cover and urge said actuator horizontally relative to said body portion to its on position through said cover.

3. The combination of claim 1 including means supporting said feeler from said base for fixed securement in selected longitudinally shifted position relative to said base and said switch means body portion.

4. The combination of claim 1 including an unsprung portion of a wheeled vehicle to which said base is secured, electrical signal means on said vehicle, a source of electrical potential, said switch means being electrically connected to said signal means and said source for action of said signal means upon movement of said actuator to said on position.

5. The combination of claim 1, said switch means including a mounting shank portion by which it is supported, said cover completely enclosing said switch means except for a free end portion of said shank portion which projects through an opening in said cover provided therefor.

References Cited

UNITED STATES PATENTS 3,265,822   8/1966   Moulton.

JOHN W. CALDWELL, *Primary Examiner.*

ALVIN H. WARING, *Assistant Examiner.*